No. 652,266. Patented June 26, 1900.
E. M. HERR.
ELECTROMAGNETIC BRAKE.
(Application filed Nov. 18, 1899.)
(No Model.) 2 Sheets—Sheet 1.
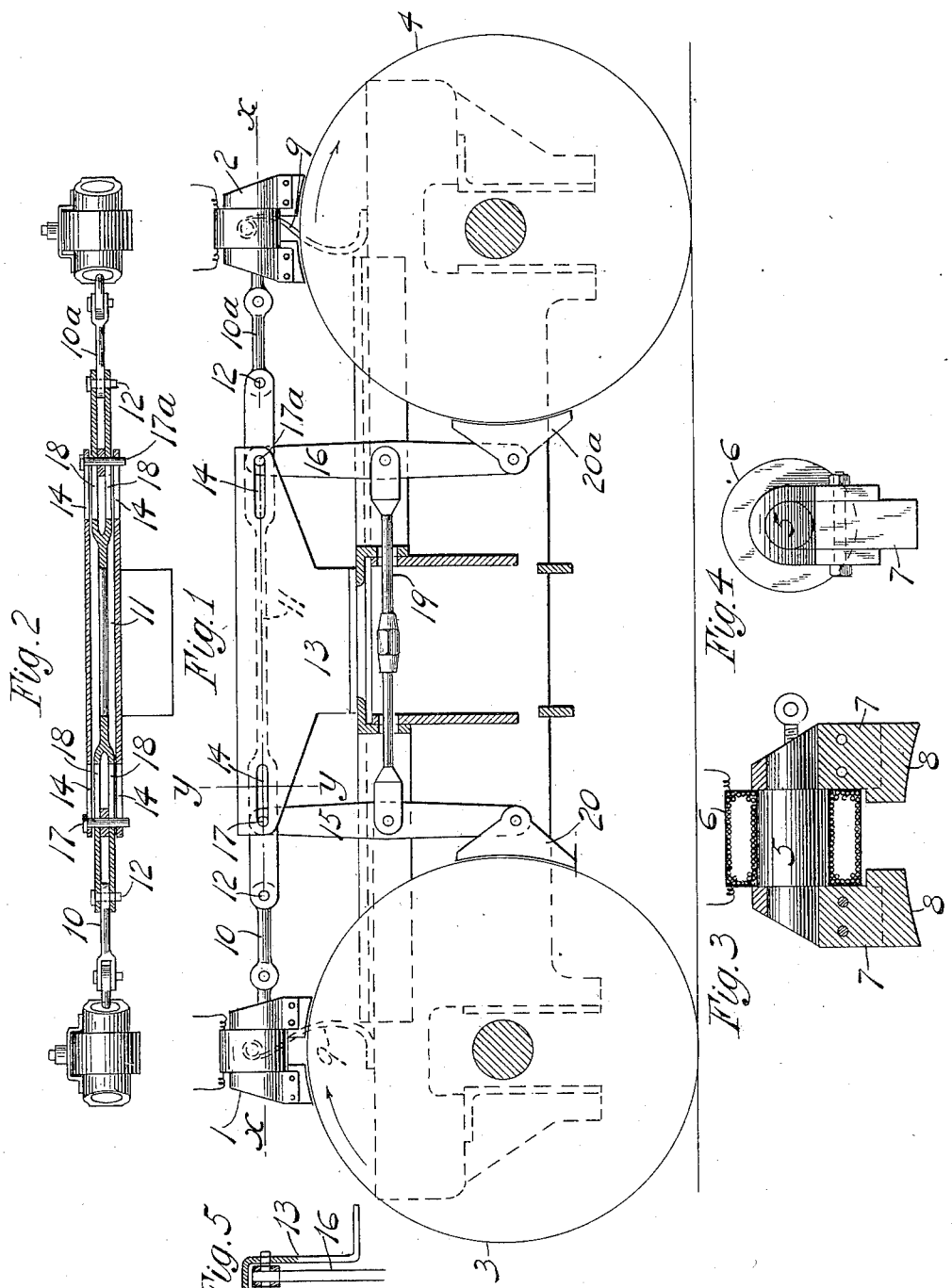

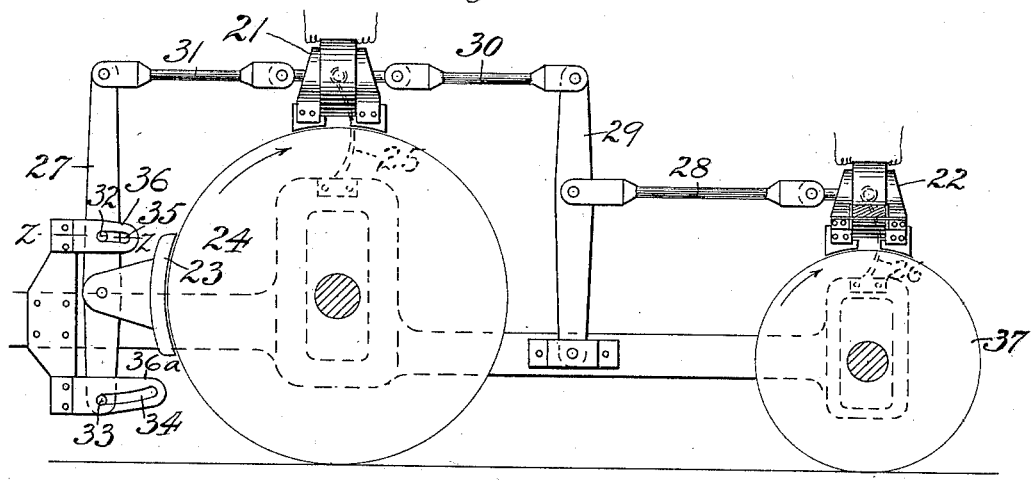
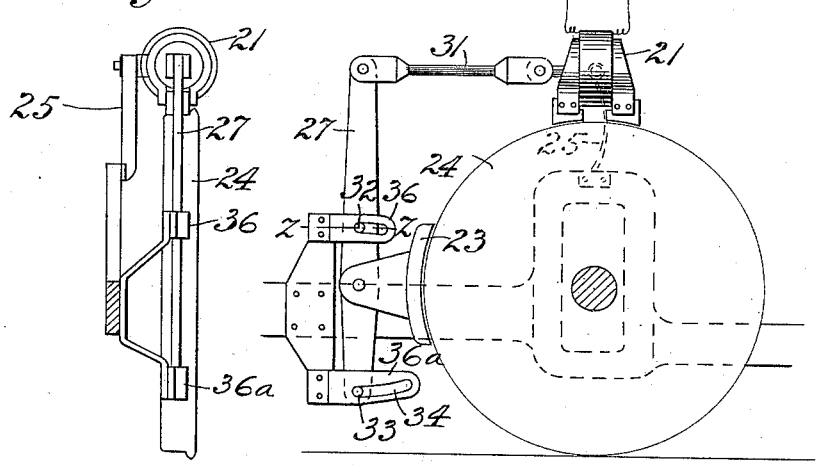

UNITED STATES PATENT OFFICE.

EDWIN M. HERR, OF PITTSBURG, PENNSYLVANIA, ASSIGNOR TO THE WESTINGHOUSE AIR BRAKE COMPANY, OF SAME PLACE.

ELECTROMAGNETIC BRAKE.

SPECIFICATION forming part of Letters Patent No. 652,266, dated June 26, 1900.

Application filed November 18, 1899. Serial No. 737,493. (No model.)

*To all whom it may concern:*

Be it known that I, EDWIN M. HERR, a citizen of the United States, residing at Pittsburg, county of Allegheny, State of Pennsylvania, have invented or discovered a certain new and useful Improvement in Electromagnetic Brakes, of which improvement the following is a specification.

The object of my invention is to provide an improvement in electromagnetic brakes for railway-cars; and to this end it consists in a new and improved electromagnetic brake apparatus comprising, in combination with a magnetic wheel-shoe, a non-magnetic wheel-shoe adapted to be operated thereby, and in certain combinations and features of construction, as hereinafter set forth.

In the accompanying drawings, which illustrate an application of my invention, Figure 1 is a vertical section through a car-truck provided with my improvement; Fig. 2, a horizontal section on the line $x\,x$ of Fig. 1; Fig. 3, a vertical section, and Fig. 4 an end view, of one of the electromagnectic brake-shoes shown in Fig. 1, but on a somewhat larger scale; Fig. 5, a vertical section on the line $y\,y$ of Fig. 1; Figs. 6 and 7, views showing modifications of my improvement; Fig. 8, an end view of the constructions shown in Figs. 6 and 7; and Fig. 9, a section the line $z\,z$ through the bracket 36 of Figs. 6 and 7, the lever 27 and the shoe 23 being omitted.

My invention provides means whereby the movement of a magnetic brake-shoe which is applied to and held in contact with a car-wheel by magnetic attraction may be utilized to actuate and exert a pressure on a non-magnetic shoe or shoes for the purpose of exerting an additional braking force, and whereby an electromagnetic brake-shoe applied to one wheel may operate to apply a braking force to another wheel, or electromagnetic brake-shoes applied to different wheels may coöperate to produce an additional braking force.

In the embodiment of my invention shown in the drawings electromagnetic brake devices 1 and 2 are shown which are adapted to apply a braking force to each of the wheels 3 and 4. Each of these electromagnetic devices comprises, in combination, an electromagnet and a pair of brake-shoes formed integral with or attached to the poles of the magnet, so that when the shoes are applied to a wheel the lines of force of the magnetic circuit may pass from one shoe to the other through the wheel to which the shoes are applied.

As shown in Figs. 3 and 4 of the drawings, a core 5 of suitable material is wound with a coil of wire 6, and attached to or formed integral with the ends of the core are extensions 7, formed with curved surfaces 8, which are adapted to make contact with the periphery of the wheel when the magnets are energized.

The magnets are supported and normally held out of contact with the wheels by springs 9 and are connected, by means of links 10 and 10ª, with a rod 11, the bifurcated ends of which embrace and are connected to the links 10 by pins 12. A bracket 13, provided at each end with horizontal slots 14, serves as a guide and support for the rod 11 and for the upper ends of the brake-levers 15 and 16, which are loosely connected to the bracket by means of pins 17 and 17ª, which pass through the upper ends of the levers and through the slots 14 in the bracket and slots 18 in the forked ends of the rod 11. The levers 15 and 16 are connected between their ends by a rod 19, and at their lower ends are attached the non-magnetic brake-shoes 20 and 20ª, which may be of any desired form or construction.

When the brake-magnets are energized, the shoes 7, which form extensions of the magnet-poles, will be pressed against the wheels by the magnetic attraction, and the wheels in turning will drag the magnetic shoes in the direction in which the part of the wheel in contact with the shoe is moving. If the wheels be turning in the direction indicated by the arrows in Fig. 1, when the magnetic shoes are drawn into contact with the wheels the magnetic device 2 will be dragged to the right, and through the rods 10ª and 11 and the pin 17 will exert a pull on the upper end of the lever 15. At the same time the magnetic device 1, which is also being dragged to the right, will through the rods 10 and 11 and the pin 17 exert a push on the upper end of the lever 15. The shoe 20 will be pressed against the wheel 3, the rod 19 and the lever 16 will be pushed to the right, and the shoe 20ᵃ will be pressed against the wheel 4, the pin 17ᵃ on the upper end of the lever 16 acting as a fulcrum. When the wheels are turning in the opposite direction, the magnetic devices 1 and 2 will be dragged toward the left and will exert, respectively, a pull and a push, which will move the upper end of the lever 16 to the left, so as to apply the shoe 20ᵃ to the wheel 4 and through the rod 19 and the lever 15 to apply the shoe 20 to the wheel 3. It will be seen that with this construction if either of the magnetic devices 1 or 2 be disconnected or omitted the other magnetic device may operate to apply both of the shoes 20 and 20ᵃ, and if both of the magnetic devices 1 and 2 are connected and in place, as shown, both or only one of them may be energized to produce a greater or lesser braking effect, as the occasion may require.

In Fig. 6 of the drawings is shown an application of my invention in which electromagnetic brake devices applied to different wheels coöperate to apply and exert a pressure on a non-magnetic shoe applied to one of the wheels. This construction is specially applicable to the wheels of cars or locomotives, whatever the motive power may be, in which are employed driving-wheels driven by the motors, and trailers or pilot wheels which are not usually geared to or connected with the motors. In such cases the wheels to the axles of which the motors are applied are usually of considerable size and carry a greater load than the other wheels and a greater braking force may be applied to them.

As shown in Fig. 6 of the drawings, an electromagnetic brake device is applied to each of the wheels, and in addition to the braking force directly exerted by each of them on the wheels, to which they are applied when the brake-magnets are energized, they coöperate to apply and hold the shoe 23 to the wheel 24.

Each of the electromagnetic brake devices 21 and 22, which are supported by springs 25 and 26, comprises an electromagnet, the pole-pieces of which are extended so as to form brake-shoes, as in the construction shown in Fig. 1, and when the magnets are energized the shoes are drawn into contact with and pressed against the wheels 24 and 36, thereby exerting a braking force. When the magnetic shoes are thus applied, the wheels tend to drag them around in the direction of rotation, and if the wheels be turning in the direction indicated by the arrows in Fig. 6 both of the magnetic brake devices 21 and 22 will be moved to the right. The device 21 will through the rod 31 pull on the upper end of the lever 27, which will turn on the pin 33 as a fulcrum and apply the shoe 22, the pin 32 being free to move to the right in the slot 35 of the bracket 36, and at the same time the device 22 will pull on the rod 28 and through the lever 29 and rod 30 will pull on the device 21 and assist in the application of the shoe 23. When the wheels rotate in the direction opposite to that shown by the arrows in Fig. 6 and the magnetic brake-shoes are applied, the device 21 will push on the rod 31, the lever 27 will turn on the pin 32 as a fulcrum, the pin 33 on the lower end of the lever will move to the right in the slot 34 of the bracket 35, and the shoe 23 will be applied. At the same time the magnetic device 22 will push on the rod 28, lever 29, and rod 30 and assist the device 21 in applying the shoe 23.

In the construction shown in Fig. 6 the braking effect may be varied by energizing both or only one of the magnetic devices.

In Fig. 7 a single magnetic brake device 21 is shown in combination with a non-magnetic brake-shoe which is adapted to be applied by the movement of the magnetic device 21 in either direction. The construction and operation of this apparatus are the same as the construction and operation of that portion of the apparatus shown on the left of Fig. 6 and acting directly on the wheel 24, the magnetic device 22 and its connections being omitted for the purpose of illustrating a simple appliation of my invention.

It will be obvious that my invention is not limited in its application to the wheels of a car, but that it is equally applicable to rotative parts of a great variety of machines.

In the embodiment of my invention as shown in the drawings it will be seen that the braking effect of the electromagnetic or primary device is undiminished by its connection with and operation of another or secondary device which is applied mechanically—that is, by the mechanical movement of the primary device and its connections, as distinguished from the magnetic force which causes the application of the primary device, an additional force is brought into action, which is proportional to and regulable in accordance with the force exerted by the magnetic or primary device, because the force with which the magnetic device may be dragged by the wheel to which it is applied is proportional to the pressure of the magnetic shoes on the wheel. Therefore any variation in the current, whether it be effected by the manipulation of a controller-handle or by a variation in the speed of the car when the magnetic devices are connected up in a local circuit with the motor or motors acting as generators, will cause a corresponding variation in the force with which the mechanically-operated shoes are applied.

I claim as my invention and desire to secure by Letters Patent—

1. In a brake apparatus, the combination of a magnetic wheel-shoe, a wheel-shoe adapted to be mechanically applied, and a connection between them, whereby the magnetic wheel-shoe may by its movement apply the other shoe.

2. In a brake apparatus, the combination of a magnetic wheel-shoe, a mechanically-operated shoe, and a connection between them, whereby the movement of the magnetic shoe, in the direction of rotation of the wheel to which it is applied, may apply the other shoe.

3. In a car-brake apparatus, the combination with a magnetic wheel-shoe adapted to be applied to a wheel by magnetic attraction, of a brake-shoe adapted to be applied to another wheel, and a connection between the shoes whereby one may operate to apply the other.

4. In a car-brake apparatus, the combination, with a magnetic wheel-shoe, of a plurality of shoes adapted to be operated thereby.

5. In a car-brake apparatus, the combination, with a magnetic wheel-shoe, of mechanically-operated shoes adapted to be applied to different wheels and connections whereby the magnetically-operated shoe may operate both of the other shoes.

6. In a car-brake apparatus, the combination, with magnetic wheel-brake devices adapted to be applied to different wheels, of mechanically-operated shoes adapted to be applied to different wheels, and means whereby the movement of either magnetic device may effect the application of the mechanically-operated shoes.

7. In a car-brake apparatus, the combination, with two magnetic wheel-brake devices adapted to be magnetically applied to wheels on different axles, of mechanically-operated shoes adapted to be applied by a pulling and a pushing action, respectively, of the magnetic devices when they are moved by the dragging action of the wheels.

8. In a car-brake apparatus, the combination, with a magnetic wheel-shoe which is adapted to be applied to a wheel by magnetic attraction, of a shoe adapted to be applied to a wheel by the drag of the magnetic shoe, in whichever direction the wheel may be rotating.

9. In a car-brake apparatus, the combination, with a plurality of magnetic wheel-shoes, adapted to be applied to wheel by magnetic attraction, of a wheel-shoe adapted to be applied by the drag of the magnetic shoes, in whichever direction they may be moved by the dragging action.

In testimony whereof I have hereunto set my hand.

EDWIN M. HERR.

Witnesses:
EDWARD BISHOP, Jr.,
JAS. B. MACDONALD.